Sept. 10, 1946.   W. C. GOSS   2,407,268
METHOD OF CALCINING COAL FOR PRODUCTION
OF AN ACTIVATED PRIMARY CARBON
Filed Nov. 22, 1943
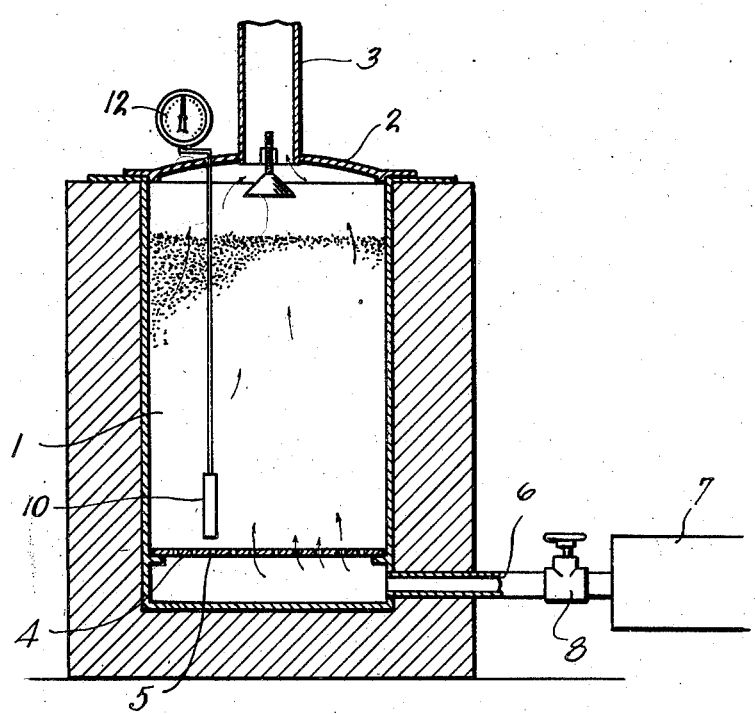
INVENTOR
WORTH C. GOSS
BY
Cook & Robinson
ATTORNEY Patented Sept. 10, 1946

2,407,268

UNITED STATES PATENT OFFICE 2,407,268

METHOD OF CALCINING COAL FOR PRODUCTION OF AN ACTIVATED PRIMARY CARBON

Worth C. Goss, Seattle, Wash., assignor to William A. Carlisle, Jr.

Application November 22, 1943, Serial No. 511,380

4 Claims. (Cl. 202—20)

This invention relates to the manufacture of primary carbon from coal, and has reference more particularly to a method of calcining coal to produce a primary carbon that can be commercially activated and which, upon proper activation, is suitable for filler in gas masks of that character used by troops in warfare as a protection against war gases.

For a better understanding of the present method, it will here be mentioned that heretofore, efforts have been made to produce a hard, granular, activated carbon direct from coal. One method of producing such carbon has been disclosed in U. S. Patent No. 2,055,755 issued on September 29, 1936, to K. B. Stewart. This patent teaches a method of calcining sub-bituminous coal that specifies a heating rate of approximately 33° C. per hour, from a starting point up to a temperature of 800° C., at which temperature, the calcined material is activated by the passing of steam through the granular mass in a specified manner.

In my experimentation and study in connection with methods of calcining coal, I have observed, through the use of the microscope, that the grains or granules of material, when calcined in accordance with Stewart's method, or by methods similar thereto, are left full of small cracks or crevices, which permit quick disintegration of the product when it is subjected to normal use in gas masks, or to other uses where it is agitated or subjected to jar.

Extensive work on the subject of calcining coal for producing a primary carbon that can be activated, has been done by the U. S. Bureau of Mines, and information gained from this source is that a calcining heat rate of approximately 50° C. per hour is most satisfactory. However, my study of this subject has brought me to the conclusion that such high rate of heat does not produce as satisfactory a product as can be produced by the slower heat rate of the Stewart process; this conclusion being supported by the fact that the granules produced by the heat rate of 50° C. per hour, when subjected to moderate pressure between thumb and finger, will break and crumble into many dust-like pieces. Therefore, the product produced by the methods using a high rate of heating that causes the granules to split or crack, is not satisfactory for gas mask use, and this is mainly due to the fact that the shaking to which the masks are subjected would cause the activated carbon to become powdery and thus render use of the mask a hazard to life rather than a means for saving life, because the dust formed clogs the air-flow through the mask, thus making breathing extremely difficult if not impossible.

I have also observed, through the use of the microscope and by experimentation, that the small granules of coal used in the manufacture of activated carbon for gas mask use, will be caused to split and break into pieces when subjected to that comparatively low internal gas pressure that is produced by a quick application of heat to the granules. Tests have shown that granules of Monarch lignite coal from Wyoming, will split or crack if raised suddenly from a temperature of 400° F. to 450° F., and furthermore will show a decided tendency to crack and disintegrate if raised suddenly from 700° F. to 710° F.

In view of the unsatisfactory characteristics of activated carbon that is made from coal by methods heretofore known, employing a relatively fast heating rate, and in view of my discoveries through experimentation and microscopic study of the effect on the granules due to quick heating, it has been the principal object of this invention to provide a method of calcining coal whereby the granules or grains will be left free of those splits and cracks that are the primary cause of its crumbling and quick disintegration in use.

Furthermore, it is an object of the invention to provide a method of calcining the granulated coal that will leave the granules in a hardened condition satisfactory for the intended uses of the product, and also in a condition permitting it to be activated by steam applied thereto in a novel method which is the subject matter of my copending application filed November 22, 1943, under Serial No. 511,379.

It is a further object of the invention to provide a novel method of calcining granulated coal whereby to produce a primary carbon with that degree of hardness required in order to pass the U. S. Army test for gas mask purposes.

In carrying out the objects of my invention, and in the practising of the method which is the subject matter of this application, I have used, with satisfaction, an apparatus such as that which is diagrammatically illustrated in the accompanying drawing, wherein—

I designates a calcining chamber of any suitable type of construction, and adapted to contain an appreciable quantity of granulated coal therein for calcination. The chamber is shown as having an open upper end, over which a removable closure or cover member 2 is removably placed. The cover has an outlet pipe 3 for escape of steam and gases.

Fitted in the lower end portion of the chamber 1, and spaced somewhat above its bottom surface, is a plate 4 formed with a multiplicity of small perforations 5. A steam delivery pipe 6 opens into the chamber, below the plate 4, and this leads from a steam superheater indicated generally at 7. A valve 8 is interposed in the pipe connection, and this may be adjusted to control the rate of steam flow to the chamber. It is desirable also that a thermocouple 10 be applied within the chamber close to the plate 4, and operatively connected with a reading dial device 12 arranged for indicating temperature at which the coal is being calcined at any particular time.

Assuming that the apparatus is so arranged, the method of calcining the coal is carried out as follows:

First, the chamber 1 would be charged with granulated coal of a fineness that passes through an eight mesh and is retained by a twenty mesh screen. After charging the chamber, the cover is applied thereto, and superheated steam is then admitted below the plate 4 upon opening the valve 8 in the connecting pipe 6. This steam first is admitted at a temperature of approximately 214° F., and is gradually increased in temperature in the superheater 7, thus to cause the temperature of the material being treated in the chamber to be raised from 214° F. to approximately 450° F. at a speed of not to exceed 25° F. per hour, or approximately 14° C. per hour. The superheated steam on entering the chamber from pipe 6 below plate 4, percolates upwardly through the ports 5 and permeates through the charge and gases escape through pipe 3.

After the temperature of the charge has reached 450° F. the rate of heating of the steam is then so controlled that the temperature of the charge is raised only at about 9° F. per hour, or 5° C. per hour, and this slow rate of heating is maintained until the temperature of the charge has reached approximately 600° F.

After the product has reached the temperature of 600° F. the slow rate of heat is continued but is watched very carefully in order to prevent destruction of the material that might be due to the reaction of oxygen with the carbon contained in the coal. If such a reaction should be imminent, it will be disclosed by the creation of an unusual amount of smoke. Then, to avoid any disruptive effect on the granules, additional steam is quickly admitted through pipe 6, which carries off or absorbs the excessive heat. Thus, the charge of material is raised from 600° F. to a temperature of approximately 770° F. at the slow rate of 9° F. per hour. After reaching the temperature of 770° F., the temperature of the steam admitted is so controlled as to retain the temperature of the charge constant for a period of approximately four hours, after which the slow heating rate is resumed until a temperature of 900° F. is reached.

Calcining is then continued above 900° F. at a more rapid rate; that is, up to 200° F. per hour until a temperature of 1200° F. or 649° C. has been reached. An exception is anthracite, where considerable caution must be used to prevent granule disruption.

This sudden change in the property of coal after it reaches the temperature of 900° F. that permits the quick finishing heat, is due apparently to the fact that the coal has been deoxygenated, and a porous structure produced in the process which permits a rapid evolution of hydrocarbon and other gaseous products.

While it has been found that the coal need not be calcined at a higher temperature than 1200° F. to produce a primary carbon that may be rendered highly active with an apparent granular density of .50, a very much denser product may be obtained if the coal is calcined to a temperature of 2,000° F. From this, a highly active product may be obtained which has an apparent density of .70. This would indicate that the apparent density of the final product can be quite closely determined by the final calcining temperature. It is to be remembered, however, that if calcining of the product is to be carried on above the 1200° temperature, this must be done out of the presence of steam or air.

It has been found most desirable for the purpose of producing gas mask filler, that the density of the coal be kept as low as possible due to the fact that certain chemical impregnating agents, which are applied to the activated product, will more readily penetrate the grains' porous structure.

The product obtained by the above described process of calcining is quite difficult to activate by conventional methods of steam or carbon dioxide activation; this being due to the fact that the method of calcining produces no appreciable cracks or pores in the granules. Thus the steam agent, ordinarily used in activating, has extreme difficulty in penetrating the calcined coal granules and imparting activity thereto. However, the present method is to overcome the cracking or splitting of granules so that the material will not become powdery in use, and the activating of this material is quite easily accomplished by the method disclosed in my copending application previously mentioned, which will satisfactorily activate the calcined coal and with a high degree of efficiency.

It is to be understood from the foregoing explanation that the basic procedure employed in this method is applicable to the production of hard, granular, calcined coal from almost any source, provided, however, that the coal used should not be a coal which cokes easily. Many kinds of coal have been treated by this process; among them being McKay bituminous coal from Washington, Utah bituminous coal, Dines sub-bituminous coal from Wyoming; also, Elkhorn lignite from Wyoming. Semi-anthracites and anthracites have been treated but with a differing temperature schedule; this method being most successful on anthracite where finer grain size is employed, such as 12 to 30 mesh. It has been demonstrated that the harder the coal, the slower should be the rate of heating as it becomes more difficult to dissipate the gases from the coal as its hardness increases.

It will be understood also that the different kinds of coals employed will require some variations in the calcining schedule set out above. However, these variations may be easily taken care of by any skilled operator merely by observing the amount of smoke evolved during the course of calcining. If smoke suddenly increases in volume, the rise in temperature should be stopped until the smoke subsides, then carefully continued.

Granulated coal of the degree of fineness set forth at the start, when calcined in accordance with the method described, will produce a hard granular material which will pass through a twelve-mesh screen and will be retained by a thirty-mesh screen, and it may be used for its intended purpose without danger of disintegration.

Heating means other than superheated steam may be used with a high degree of satisfaction, particularly on anthracite coal, so long as the evolved gas is not permitted to split the coal granules. In other words, quick increases in temperature must be avoided prior to the formation of a pore structure throughout the coal granules.

At the present time, the coal I have found best is anthracite from the Primrose vein in Lewis county, Washington. This coal produces an activated carbon that is essentially the equal in hardness of cocoanut shell material. In addition, this activated coal has a remarkable retentivity for gases such as chloropicrin. This is due probably to the extremely fine pore structure which can be developed in this hard, dense product.

Having thus described my invention, what I claim as new therein and desire to secure by Letters Patent is:

1. The method of calcining coal, comprising granulating the coal to a degree of fineness that it passes through an 8-inch screen and is retained by a 20-mesh screen confining the granulated coal in a calcining chamber, then subjecting the material by a direct application of super-heated steam thereto, to increase its temperature between 214° F. and approximately 450° F. at a rate not exceeding 25° F. per hour, then continuing to increase its temperature at a rate not to exceed 9° F. per hour until the material attains a temperature of approximately 770° F., then maintaining this temperature constant for approximately four hours, and then increasing its temperature to that for final calcination.

2. The method of calcining coal, comprising granulating the coal to a degree of fineness that it passes through an 8-mesh screen and is retained by a 20-mesh screen confining the granulated coal in a calcining chamber, then subjecting the material to a direct application of super-heated steam whereby to increase its temperature between 214° F. and 450° F. at a rate not to exceed 25° F. per hour; then continuing to increase its temperature at a rate of not to exceed 9° F. until a temperature of approximately 770° F. is reached, then retaining the temperature of the material constant for a period of approximately four hours, then increasing the temperature to 1200° F. at a rate not exceeding 200° F. per hour.

3. The method of calcining coal, comprising granulating the coal to a degree of fineness that it passes through an 8-mesh screen and is retained by a 20-mesh screen, placing the granulated coal in a calcining chamber, then subjecting it to a flow of super-heated steam therethrough to heat it from 214° F. to approximately 450° F. at a rate of not more than 25° per hour, then continuing to heat by flow of super-heated steam therethrough to a temperature of approximately 770° F. at a rate of not more than 9° F. per hour; then through a controlled flow of super-heated steam therethrough to hold the temperature of the material constant at approximately 770° for a period of approximately four hours, then through direct application of super-heated steam to raise the temperature of the material to 1200° F. at not more than 200° F. per hour and then continuing to the final calcining temperature.

4. The method as recited in claim 3 wherein in the final heating, above 1200° F., the material is excluded from the presence of air or steam.

WORTH C. GOSS.